US009530104B1

United States Patent
Laptev et al.

(10) Patent No.: US 9,530,104 B1
(45) Date of Patent: Dec. 27, 2016

(54) SCALABLE BOOTSTRAP METHOD FOR ASSESSING THE QUALITY OF MACHINE LEARNING ALGORITHMS OVER MASSIVE TIME SERIES

(71) Applicant: HRL Laboratories, LLC, Malibu, CA (US)

(72) Inventors: Nikolay Laptev, Ventura, CA (US); Tsai-Ching Lu, Wynnewood, PA (US)

(73) Assignee: HRL Laboratories, LLC, Malibu, CA (US)

( * ) Notice: Subject to any disclaimer, the term of this patent is extended or adjusted under 35 U.S.C. 154(b) by 400 days.

(21) Appl. No.: 14/175,899

(22) Filed: Feb. 7, 2014

Related U.S. Application Data

(60) Provisional application No. 61/784,025, filed on Mar. 14, 2013.

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
CPC ................................................. G06N 99/005
USPC ................................................ 706/12, 45, 62
See application file for complete search history.

(56) References Cited

PUBLICATIONS

P. Bhlmann and H.R. Knsch. Block length selection in the bootstrap for time series. Computational Statistics and Data Analysis, 31(3):295-310, 1999.

B. Efron. Bootstrap methods: Another look at the jackknife. Annals of Statistics, 7(1)1-26, 1979.

J. Ekanayake, H. Li, B. Zhang, T. Gunarathne, S.-H. Bae, J. Qiu, and G. Fox. Twister: a runtime for iterative mapreduce. HPDC, pp. 810-818, 2010.

A. Kleiner, A. Talwalkar, P. Sarkar, and M. Jordan. Bootstrapping big data. NIPS, 2011.

A. Kleiner, A. Talwalkar, P. Sarkar, and M. I. Jordan, A Scalable bootstrap for massive data. Technical report, UC Berkeley, 2012.

N. Laptev, K. Zeng, and C. Zaniolo, Early accurate results for advanced analytics on mapreduce. PVLDB, 5 (10):1028-1039, 2012.

J. Lin and A. Kolcz. Large-scale machine learning at twitter. SIGMOD, pp. 793-804, 2012.

D. N. Politis and J. P. Romano. The Stationary Bootstrap. Journal of the American Statistical Association, 89 (428):1303+, Dec. 1994.

D. N. Reshef, Y. A, Reshef, H. K. Finucane, S. R. Grossman, G. McVean, P. J. Turnbaugh, E. S. Lander, M. Mitzenmacher, and P. C. Sabeti. Detecting novel associations in large data sets. Science, 334(6062):1518-1524, 2011.

J. Shao and D. Tu. The jackknife and bootatrap. Springer series in statistics 1995. Chapter 2 & 3 [sent to ST on May 19, 2014].

(Continued)

*Primary Examiner* — David Vincent
(74) *Attorney, Agent, or Firm* — Tope-McKay & Associates

(57) ABSTRACT

Described is a system for assessing the quality of machine learning algorithms over massive time series. A set of random blocks of a time series data sample of size n is selected in parallel. Then, r resamples are generated, in parallel, by applying a bootstrapping method to each block in the set of random blocks to obtain a resample of size n, where r is not fixed. Errors are estimated on the r resamples, and a final accuracy estimate is produced by averaging the errors estimated on the r resamples.

20 Claims, 8 Drawing Sheets

(56) References Cited

PUBLICATIONS

Nikolay Laptev, Carlo Caniolo, Tsai-Ching Lu, BOOT-TS: A Scalable Bootstrap for Massive Time Series Data, NIPS 2012 Workshop on Parallel and Large Scale Machine Learning (Big Learning), Lake Tahoe, Nevada, CA, Dec. 2012.

S. U. D. of Statistics, D. Politis, J. Romano, and N. S. F. (U.S.), A Circular Block-resampling Procedure for Stationary Data 1991.

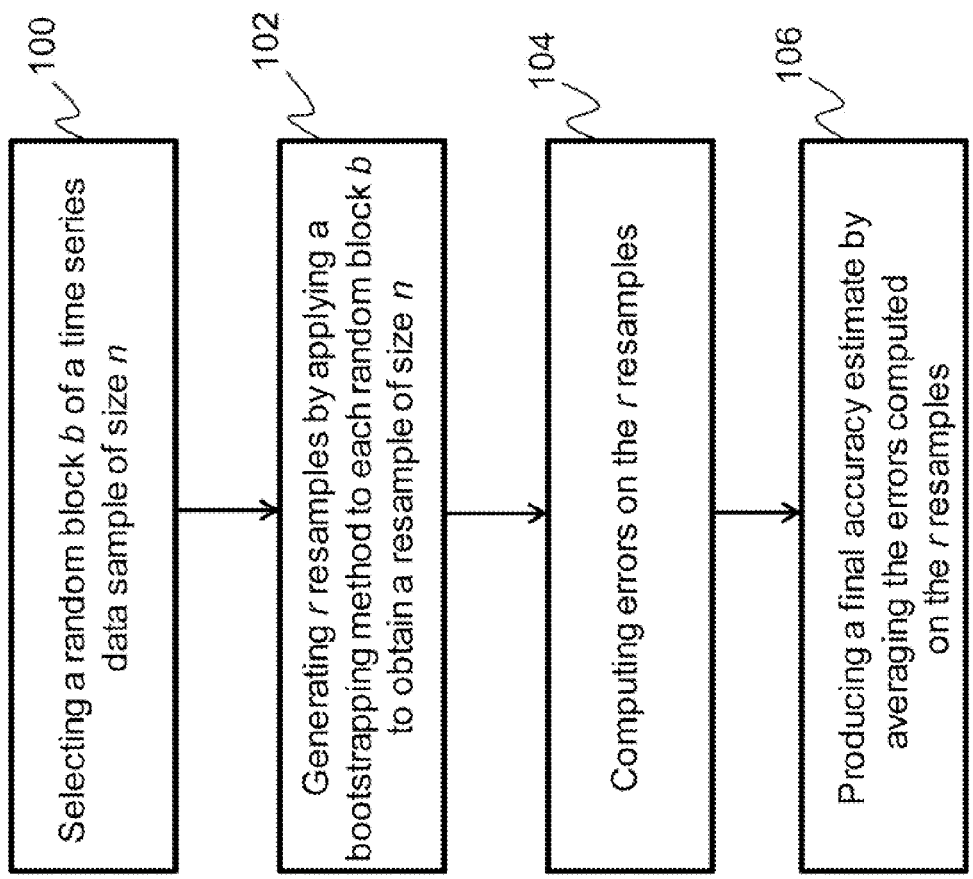

SCALABLE BOOTSTRAP METHOD FOR ASSESSING THE QUALITY OF MACHINE LEARNING ALGORITHMS OVER MASSIVE TIME SERIES

CROSS-REFERENCE TO RELATED APPLICATIONS

This is a Non-Provisional patent application of U.S. Provisional Application No. 61/784,025, filed in the United States on Mar. 14, 2013, entitled, "Scalable Bootstrap Method for Assessing the Quality of Machine Learning Algorithm over Massive Time Series."

GOVERNMENT LICENSE RIGHTS

This invention was made with government support under U.S. Government Contract Number D122PC00285, IARPA Open Source Indicator. The government has certain rights in the invention.

BACKGROUND OF THE INVENTION (1) Field of Invention

The present invention relates to a system for assessing the quality of machine learning algorithms over massive time series and, more particularly, to a system for assessing the quality of machine learning algorithms over massive time series using a scalable bootstrap method.

(2) Description of Related Art

Bootstrapping is a method for assigning measures of accuracy to sample estimates. With bootstrapping, inference about a population from sample data can be modeled by resampling the sample data and performing inference on the resamples.

Authors in Literature Reference No. 5 (see the List of incorporated Cited Literature References) provide a scalable bootstrap (see Literature Reference No. 11) used for quality assessment of general machine learning algorithms over independent and identically distributed (i.i.d.) data. Their technique, termed The Bag of Little Bootstraps, works by splitting the original sample of size n into s parts of size b where $b=n^{0.5}$.

The state of the art techniques for time-series bootstrapping are not well suited for today's massive time series data. In particular, the general approach of bootstrap techniques for time series (see Literature Reference Nos. 1 and 9) performs resampling by selecting a random block of size b until the required sample size is reached. Approaches proposed in Literature Reference Nos. 1 and 9 are not applicable for massive time-series data, because they deal with the whole dataset each time.

Each of the prior methods described above exhibit limitations that make them incomplete. Thus, a continuing need exists for assessing the quality of machine learning algorithms for large time series data samples in a distributed environment.

SUMMARY OF THE INVENTION

The present invention relates to system for assessing the quality of machine learning algorithms over massive time series and, more particularly, to a system for assessing the quality of machine learning algorithms over massive time series using a scalable bootstrap method. The system comprises one or more processors and a memory having instructions such that when the instructions are executed, the one or more processors perform multiple operations. First a set of random blocks of a time series data sample of size n is selected in parallel, wherein the time series data sample comprises a plurality of data points. r resamples are generated, in parallel, by applying a bootstrapping method to each block in the set of random blocks to obtain a resample of size n, wherein r is not fixed. Errors are then estimated on the r resamples. Finally, a final accuracy estimate is produced by averaging the errors estimated on the r resamples.

In another aspect, the system applies a stationary bootstrap (SB) method to each block in the set of random blocks by appending a next data point in the time series data sample to a current block in the set of random blocks with a probability 1-p, and appending a random data point from the set of random blocks with a probability p to the current block in the set of random blocks.

In another aspect, the system estimates an error for each block in the set of random blocks by applying a Monte Carlo approximation to repeatedly resample each block in the set of random blocks using the SB method and estimate the errors on each r resample, resulting in r resample estimates.

In another aspect, a number of resamples r is determined individually by each processor.

In another aspect, the system forms an empirical probability distribution from the r resample estimates to approximate $\xi(Q_{n,j})$, where $\xi$ denotes an estimator quality parameter, Q denotes the empirical probability distribution, n denotes the sample size, and j denotes the block number.

In another aspect, the system averages the errors estimated on the r resamples across all of the processors, and produces a final accuracy estimate $s^{-1}\Sigma_{j=1}^{s}\xi^{*}_{n,j}$, where s denotes the number of blocks, and $\Sigma$ denotes a summation.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, wherein:

FIG. 1 is a flow diagram illustrating a system for assessing the quality of machine learning algorithms over massive time series according to the principles of the present invention;

DETAILED DESCRIPTION

Figure 2A:
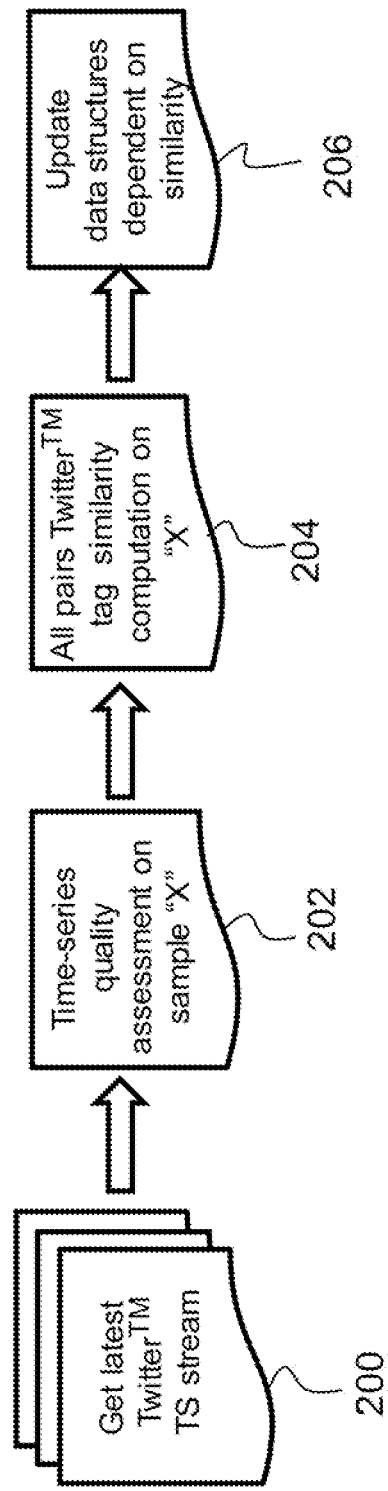
FIG. 2A illustrates an example Twitter™ hashtag association computation according to the principles of the present invention.

The present invention relates to a system for assessing the quality of machine learning algorithms over massive time series and, more particularly, to a system for assessing the quality of machine learning algorithms over massive time series using a scalable bootstrap method. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the in that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. P. Behlmann and H. R. Kunsch. Block length selection in the bootstrap for time series. Computational Statistics and Data Analysis, 31(3): 295-310, 1999.
2. B. Efron. Bootstrap methods: Another look at the jackknife. Annals of Statistics, 7(1):1-26, 1979.
3. J. Ekanayake, H. Li, B. Zhang, T. Gunarathne, S.-H. Bae, J. Qiu, and G. Fox. Twister: a runtime for iterative mapreduce. HPDC, pages 810-818, 2010.
4. A. Kleiner, A. Talwalkar, P. Sarkar, and M. Jordan. Bootstrapping big data. NIPS, 2011.
5. A. Kleiner, A. Talwalkar, P. Sarkar, and M. I. Jordan. A scalable bootstrap for massive data. Technical report, UC Berkeley, 2012.
6. N. Laptev, K. Zeng, and C. Zaniolo. Early accurate results for advanced analytics on mapreduce. PVLDB, 5(10):1028-1039, 2012.
7. J. Lin and A. Kolcz. Large-scale machine learning at twitter. SIGMOD, pages 793-804, 2012.
8. Stanford University Department of Statistics, D. Politis, J. Romano, and N. S. F. (U.S.). A Circular Block-resampling Procedure for Stationary Data, 1991.
9. D. N. Politis and J. P. Romano. The Stationary Bootstrap. Journal of the American Statistical Association, 89(428):1303-1313, December 1994.
10. D. N. Reshef, Y. A. Reshef, H. K. Finucane, S. R. Grossman, G. McVean, P. J. Turnbaugh, E. S. Lander, M. Mitzenmacher, and P. C. Sabeti. Detecting novel associations in large data sets. Science, 334(6062): 1518-1524, 2011.
11. J. Shao and D. Tu. The jackknife and bootstrap. Springer series in statistics. 1995.

(2) Principal Aspects

The present invention has three "principal" aspects. The first is a system for assessing the quality of machine learning algorithms over massive time series. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for assessing the quality of machine learning algorithms over massive time series. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Specific Details

Described is a simple, accurate, and scalable technique for assessing the quality of results computed from samples of real-world time series data. The technique allows the average user, or a small business, to derive analytics on data of massive sizes by using sampling.

A large portion of today's data is in a time series format (e.g., Twitter™ stream, system logs, blog posts). Time constraints, as well as monetary constraints, force a user to work on only a sample of the data, for which a quality assessment is required. Furthermore, the trend of dataset growth is accelerating, with "big data" becoming increasingly prevalent. The original bootstrap approach (see Literature Reference Nos. 2 and 11) and its time series variants (see Literature Reference Nos. 1 and 9) provide a simple way of assessing the quality of an estimate. However, in a distributed environment, the cost of transferring the data to independent processors as well as the cost of computing a single resample can be high. This is a source of incessant problems in the natural life-cycle of advanced analytics development and a major stumbling block that prevents interactive result exploration that many users desire (see Literature Reference Nos. 6 and 7). Thus, a scalable and efficient way of assessing the quality of an estimator (i.e., a rule for calculating an estimate of a given quantity based on observed data) for large time series data samples in a distributed environment is needed.

Reliable estimation of the quality obtained from sampled data often leads to sample sizes that are orders of magnitude smaller than the original dataset, thus providing major savings in terms of time and money. Consider the case of a user who wishes to debug a given algorithm locally before deploying to production. In this case, the user wishes to work on a sample of the full data that is small enough to run on an average laptop, yet large enough to meet the user specified error bound. When the same user deploys his or her application on the cloud system, such as Amazon's Elastic Compute Cloud EC2, money and time can be saved by only working with a sample of the data and using only the needed resource, since pricing of cloud services is based on storage and processing unit usage.

The invention described herein improves upon previous work of bootstrap and time-series theories to provide a scalable approach for assessing the quality of large time series data samples. The present invention takes advantage of the trend in computational resources, which is shifting towards a multi-core and distributed architecture with cloud services providing thousands of processing units. These new processing units support fast execution of applications working on large data.

As shown in the flow diagram of the bootstrapped time series system (BOOT-TS) in FIG. 1, according to the principles of the present invention, a set of random blocks b is selected from the original time series (step 100). Then, in parallel, r resamples are generated by applying SB to each block b to obtain a resample of size n (step 102). In one embodiment of the present invention, r is not fixed, and each compute node can converge independently. The system then computes the error, defined as the coefficient of variation, on the resamples (step 104). The errors, computed on the resamples are then averaged across all nodes to produce the final accuracy estimate (step 106). Thus, in BOOT-TS, the estimator is applied on only a single block b instead of on the entire time series sample. Therefore, the computational cost incurred only depends on the size of b (i.e., block size) and not on the size of the resample n. Each of these steps is described in further detail below.

The difficulty in supporting fast and accurate estimator assessment based on a sample has long been recognized as one of the major obstacles in interactive big data processing (see Literature Reference Nos. 3 and 5). The problem is more complicated when the data are a time series, because bootstrapping must be carried out in a way that captures the dependence structure of the data generation process.

As a concrete application of BOOT-TS, Twitter™ analytics workflows were used. The workflows are composed of the following four stages. (1) Get latest Twitter™ data of size W; (2) estimate error based on a sample n of W; (3) compute the similarity between Twitter™ hashtags from the sample; and (4) update internal application specific tag similarity model (i.e., tag similarity graph where edge weights are similarity scores and nodes are tags). Samples are consecutive in time as drawn by the method according to the principles of the present invention. The second step is computed infrequently only to estimate the sample size required to achieve a user-defined accuracy. The goal of this workflow is to compute a similarity score of all hashtag pairs based on an algorithm called MIC (Maximum Information Coefficient) (see Literature Reference No. 10), which is roughly equivalent to Pearson's correlation for linear relationships.

FIG. 2A illustrates an example Twitter™ hashtag association computation similar to that described above. In a first step 200, the latest Twitter™ time-series (TS) is obtained. In a second step 202, there is a time-series quality assessment on a sample "X". In a third step 204, an all-pairs Twitter™ tag similarity computation on "X" is performed. In a fourth step 206, application specific data structures are updated depending on the computed similarity (i.e., tag similarity graph where edge weights are similarity scores and nodes are tags).

Figure 2B:
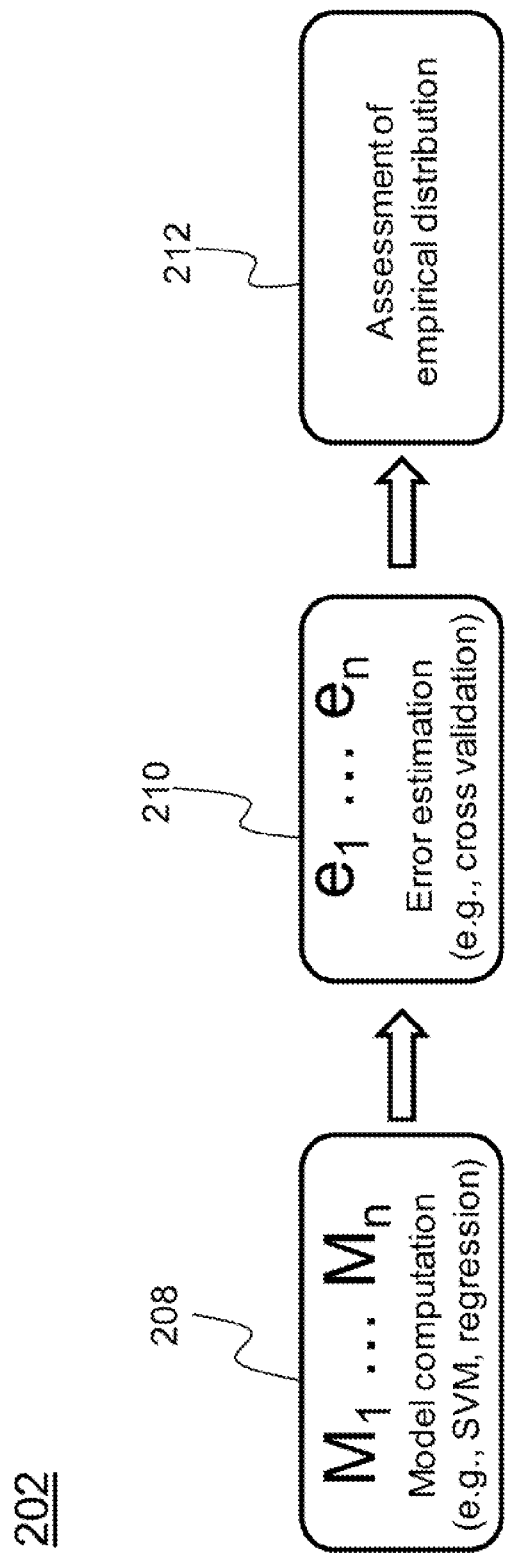
FIG. 2B is an illustration of a time-series quality assessment of sample data according to the principles of the present invention.

While all stages of this workflow provide interesting challenges, the present invention is directed to the second step of the workflow shown in FIG. 2A. FIG. 2B illustrates an overview of the second step 202 in FIG. 2A. First, model training 208 is performed resulting in a set of models $M_1 \ldots M_n$. The error for each $M_i$ is then estimated using cross validation 210. The resulting error estimates $e_1 \ldots e_n$ are then used to plot the error distribution from which bias, confidence, and standard deviation are computed 212.

(3.1) Preliminaries

Let $\{X_i\}_{i=-\infty}^{\infty}$ be an $\mathbb{R}^d$-valued (all real numbers) stationary process observed from some underlying distribution $P \in \mathbb{P}$ with $\mathbb{P}_n = n^{-1}\Sigma_{i=1}^n \delta_{X_i}$ denoting the corresponding probability distribution. The probability distribution could be a parametric distribution (e.g., normal distribution, exponential distribution), where a few parameters can describe the shape and form of the distribution. Additionally, the probability distribution could be a non-parametric (i.e., empirical) distribution, which is directly derived from data without fitting of parameters. The above is a description of the stationary bootstrap process.

Let $\mathbb{X}_n = \{X_1, \ldots, X_n\}$ denote the available observations (usually drawn independent and identically distributed (i.i.d.) from $\{X_i\}$). Based on $\mathbb{X}_n$, an estimator $\hat{\theta}_n$ of the parameter of interest $\theta$ is computed. $\hat{\theta}_n$ may, for example, estimate the accuracy of a classifier. Borrowing notation from Literature Reference No. 5, $Q_n\{P\} \in Q$ is defined as the true distribution of $\hat{\theta}_n$. Thus, the final goal is to estimate $\xi(Q_n\{P\}, P)$. In the present invention, $\xi$ denotes the coefficient of variation, but it can also denote bias, standard error, confidence region, or a quantile. Using bootstrap with Monte Carlo approximation (see Literature Reference No. 2 for an example of Monte Carlo approximation), one can repeatedly resample n points i.i.d. from $\mathbb{P}_n$ from which an empirical distribution $Q_n$ is formed and from which $\xi(Q_n\{P\}, P) \approx \xi(Q_n)$ is approximated. For block bootstrapping, let the expected size of the block be l which is an integer satisfying 1<l<n. The present invention uses the Stationary Block bootstrap (SB) (see Literature Reference No. 9 for an example of the Stationary Block bootstrap), which functions as follows.

Let $L_1 \ldots L_k$ be conditionally i.i.d. random variables with parameter $p=l^{-1} \in (0,1)$. Also, let $I_1, \ldots, I_n$ be conditionally i.i.d. random variables with the discrete uniform distribution on $\{1, \ldots, n\}$. Then, the SB resample $X^*_1, \ldots, X^*_n$ is produced from the first n elements in the array $B(I, L_1), \ldots B(I, LK)$, where $K \equiv \inf\{\daleth \geq 1: L_1 + \ldots + L\daleth \geq n\}$ and where the block $B(i, \daleth) = (X_i, \ldots, X_{i+\daleth-1})$, $i \geq 1$, $\daleth \geq 1$. The key difference between BOOT-TS and Literature Reference Nos. 2 and 5 is that it focuses on scalability when extending the bootstrap to time series.

(3.2) BOOT-TS: The Scalable Time Series Resampling Process

Predicting the quality of an estimate over time series can be done in a parallel way using bootstrap variations for time series (see Literature Reference Nos. 1, 8, and 9). The time series data is sent to all compute nodes on which block, sampling is applied. Compute nodes are commonly known as individual computers; however, the nodes referred to in the present invention may also represent individual processors or even clusters of computers. Since only a certain number of resamples need to be produced, the computation time simply scales down with the number of nodes. This naïve approach is inefficient, because it sends the entire dataset to all machines, which can still be impractical for large datasets. However, the authors in Literature Reference No. 5 addressed this concern for i.i.d. data by splitting the sample into chunks (i.e., blocks) and processing each chunk in parallel, thus avoiding sending the whole dataset to all nodes. The limitation of the solution proposed in Literature Reference No. 5 is that (i) it is only applicable to i.i.d. data and (ii) it treats all block samples as equal. In practice, however, some nodes may get a bad block sample. Therefore, more resamples will be required for convergence, whereas some nodes may converge quicker due to a good block sample. This means that setting a fixed r, as is done in Literature Reference No. 5, may lead to inefficiencies. The BOOT-TS process solves the above problems, as described below.

(3.3) BOOT-TS Process

The BOOT-TS process works by first selecting a random block b from a set of possible blocks $\mathbb{B}(\mathbb{I}, L_1), \ldots \mathbb{B}(\mathbb{I}, L_\mathbb{K})$ observed in the time series sample (FIG. 1, element 100). The stationary bootstrap is then applied to each block by appending the next value in the time series (wrapping around if necessary) to the current block with probability 1-p, and appending a random point from b with probability p to the current block (FIG. 1, element 102). Note that although other time series approaches are applicable, the present invention, in one aspect, focuses on SB due to its robustness with respect to block size (see Literature Reference No. 9).

After applying the stationary bootstrap to each block, the error $\xi(Q_n(\mathbb{P}_{n,b}^{(j)}))$ for each block b is estimated by applying the Monte Carlo approximation (standard bootstrap) via repeatedly resampling of all of the blocks using the SB method and computing the estimates on each resample (FIG. 1, element 104). The number of resamples r is locally determined by each node with $O(r) \approx 100$. Local convergence is important, because two nodes, having subsamples of different quality, should not have the same r. Thus, by locally determining r for each block b, BOOT-TS is less sensitive to the quality and to the size of b than SB. Note that if a local node converged after in resamples, BOOT-TS must append r-m resample estimates to $\hat{\theta}^*_n$ which is done by drawing r-m resample estimates i.i.d. from $\hat{\theta}^*_m$. Note that s is dependent on b and at convergence can be as low as 1-5 blocks for $b=n^{0.9}$ or 10-20 for $b=n^{0.5}$, which is consistent with results for i.i.d. data found in Literature Reference No. 5. The r resample estimates then form an empirical probability distribution which is used to approximate $\xi(Q_n(P_{n,b}^{(j)})) \approx \xi(\mathbb{Q}_{n,j})$. The quality estimates are then averaged across all the nodes and final error is returned as $s^{-1}\Sigma_{j=1}^{s}\xi^*_{n,j}$ (FIG. 1 element 106).

(3.4) Experimental Studies (3.4.1) Implementation

The performance of an embodiment of BOOT-TS relies on the two design decisions of adopting: (1) model-error computation separation; and (2) convergence aware computation. The first decision proved invaluable for achieving a simple application programming interface (API) design that was easy to understand and test. In model-error computation separation, the error computation is performed in three stages: (a) model training; (b) model testing; and (c) error derivation from empirical distribution of (b). It is important to realize that a lot of machine learning algorithms fall under this three-stage model, and the quality assessment of many classic machine learning algorithms (e.g., support vector machine (SVM), regression) can easily be expressed using it.

The second decision of convergence aware computation is also important because, in providing block samples, not every block will be a good representation of the entire time series. Error computation on some nodes may actually converge faster; therefore, in the present invention, r is used as an upper-bound of the Monte Carlo iterations, and each node instead uses a threshold for local convergence checking (i.e., a threshold for checking when convergence is complete). Note, however, that all nodes produce the same number of error estimates because $|\hat{\theta}^*_n|$ is enlarged to r via i.i.d. resampling, if necessary. Below is a non-limiting example of an embodiment of the BOOT-TS process according to the principles of the present invention.

Input: Time-series data sample $X_1, \ldots, X_n$ b: Selected subsample $\hat{\theta}$: Estimator of interest s: Number of sampled blocks $\xi$: Estimator quality assessment r: Maximum number of Monte Carlo iterations Output: An estimate of $\xi(Q_n(P))$ for j←1 to s do Randomly select a block b from $\mathbb{B}(X, L_1), \ldots, \mathbb{B}(X, L_K)$ for k←1 to r do while Size of Sample≤n do if rgeom(1,p)==0 then currentIndex←A random index in b

```
    pick the next item as b[currentIndex] and continue
end
    pick the next item in the sample as b[currentIn-
        dex++]
end
```

$$P^*_{n,k} \leftarrow n^{-1} \sum_{a=1}^{b} n_a \delta_{X_{i_a}}$$

$\hat{\theta}^*_{n,k} \leftarrow \hat{\theta}(\mathbb{P}^*_{n,k})$

```
check if θ̂*_{n,k} converged and if so, append (r-k) esti-
    mates to θ̂*_{n,k} drawn i.i.d. from θ̂*_{n,k} and break
end
```

$$Q^*_{n-j} \leftarrow r^{-1} \sum_{k=1}^{r} \delta_{\hat{\theta}^*_{n,k}}$$

$\xi^*_{n-j} \leftarrow \xi(Q^*_{n,j})$

```
end
return s^{-1} Σ_{j=1}^{s} ξ*_{n,j}
```

(3.4.2) Experimental Results

All experiments were performed on a 7-node cluster with 140 map-slots on Hadoop 1.0.4 by the Apache Software Foundation. Each node was a 16-core AMD™ Opteron™ Processor 6134@2.3 Gigahertz (GhZ) with 132 gigabytes (GB) random-access memory (RAM). The total Twitter™ dataset is of size (X).

Figure 3A:
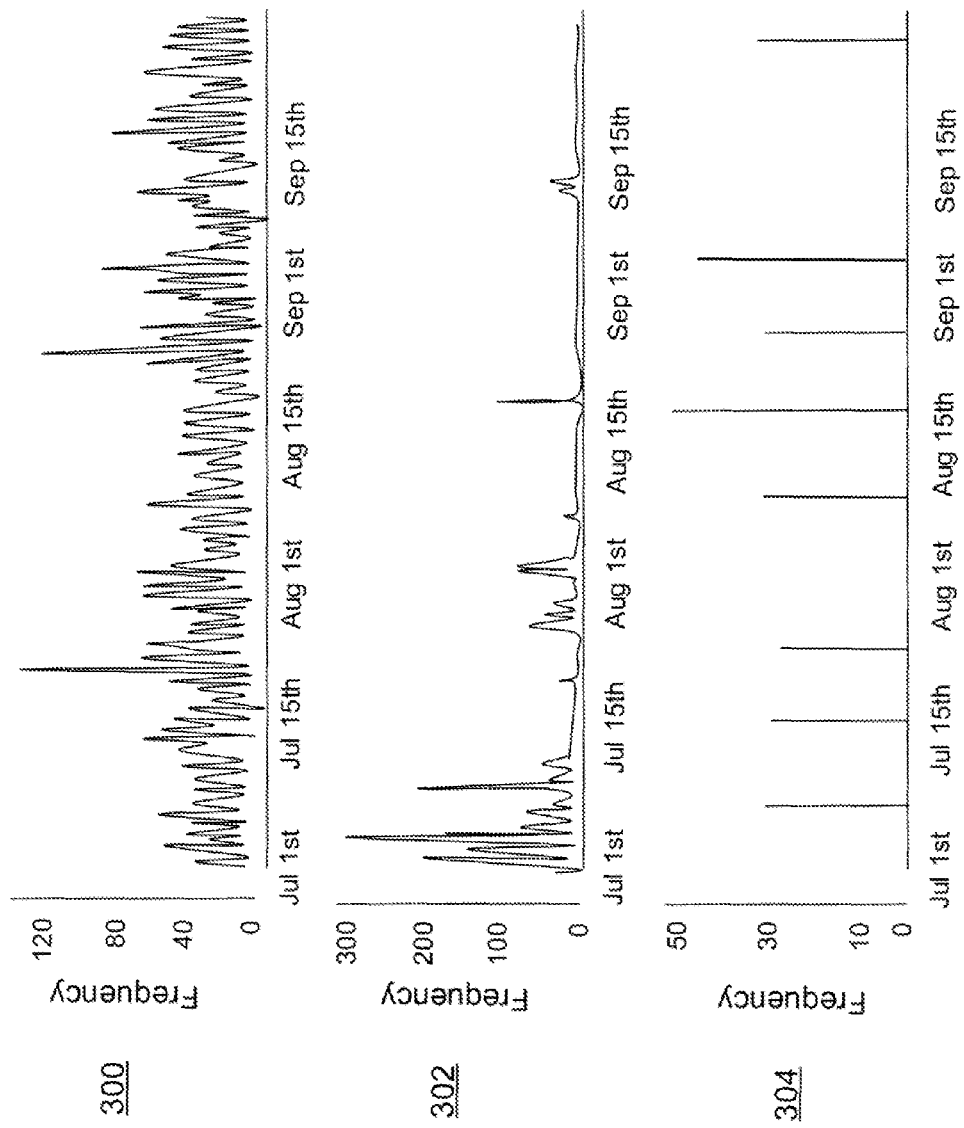
FIG. 3A illustrates three time-series plots for three hashtags over a period three months according to the principles of the present invention.

FIG. 3A shows three time series frequency patterns that were tested, plot 300, plot 302, and plot 304, for three hashtags, #youtube, #riot, and #soccerdotcom, respectively, over a period of three months. The experiments in production, however, were run on two million tags with the goal of determining similarity measure across all $$\frac{(n-1)(n)}{2}$$

hashtag pairs. Note that some tags may have many random spikes (e.g., #riot), some tags may be fairly stable (e.g., #youtube), and some may show very little level of activity (e.g., #soccerdotcom).

Figure 3B:
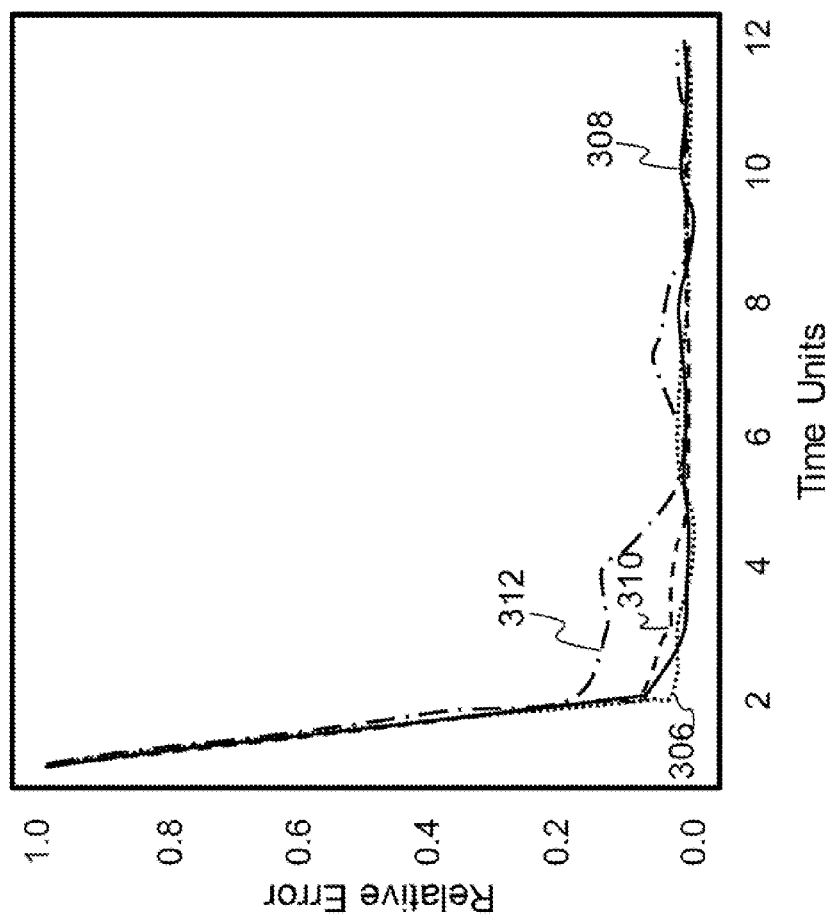
FIG. 3B is a plot illustrating the convergence rate of BOOT-TS and Stationary Bootstrap (SB) according to the principles of the present invention.

FIG. 3B shows the convergence rate of BOOT-TS and Stationary Bootstrap (SB). Along the x-axis is time, and along the y-axis is relative error. BOOT-TS (curves 306, 308, and 310) succeeds in converging to a low relative error significantly faster than the Stationary Bootstrap (curve 312). Curve 306 represents BOOT-TS with a block size of 10%. Curve 308 represents BOOT-TS with a block size of 20%. Curve 310 represents BOOT-TS with a block size of 30%. Although only convergence results for similarity computation are shown, similar results were observed for other machine learning tasks, such as SVM and linear regression. In summary, the convergence rate of BOOT-TS is quicker than that of SB.

Figure 3C:
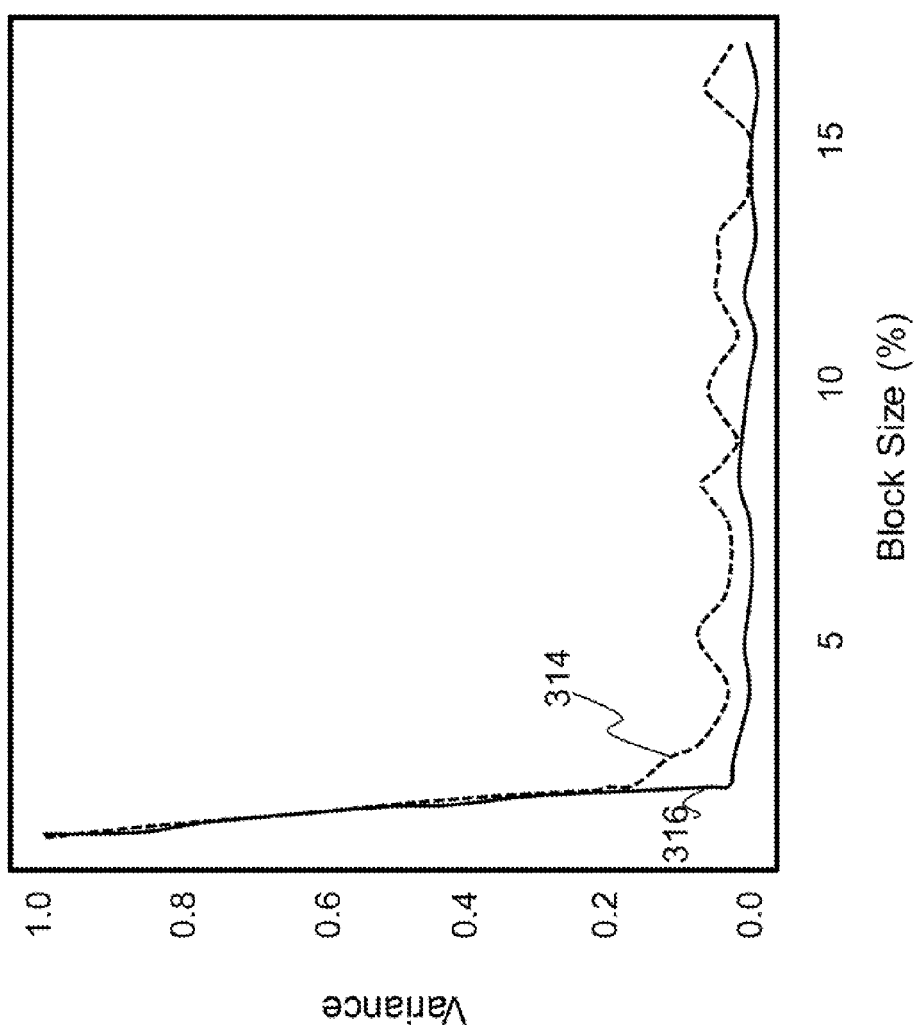
FIG. 3C is a plot illustrating the block size dependence on the estimated variance of SB and BOOT-TS according to the principles of the present invention.

FIG. 3C shows the block size dependence on the estimated variance of the stationary bootstrap (SB) (represented by curve 314) and of the BOOT-TS (represented by curve 316). Along the x-axis is block size by percent, and along the y-axis is variance. Notice that the variance of the BOOT-TS is much more stable than that of the SB and, therefore, in practice the user can be much less concerned with picking the perfect block size. In summary, BOOT-TS is less dependent on block size than SB.

Figure 4:
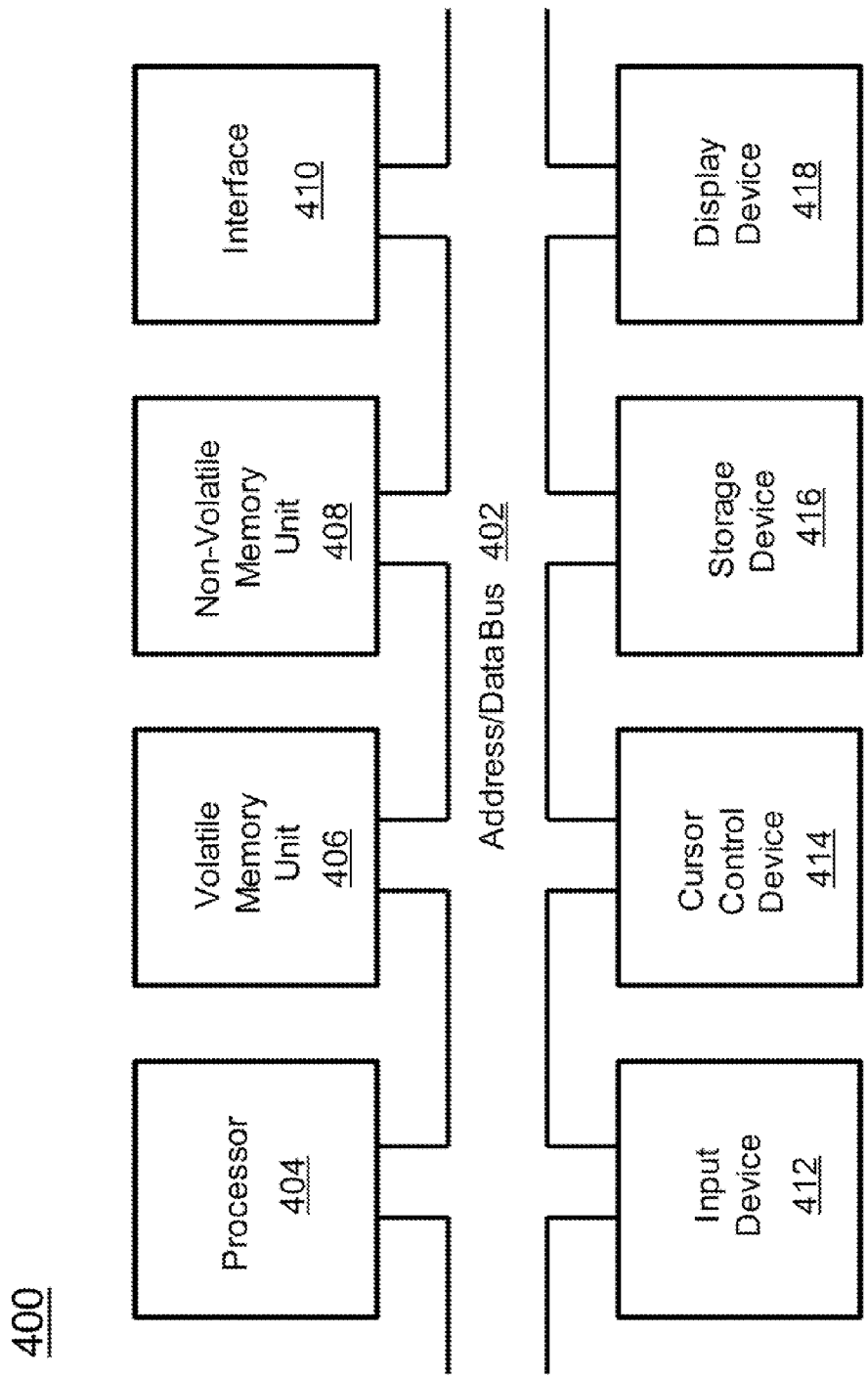
FIG. 4 is an illustration of a data processing system according to the principles of the present invention.

An example of a computer system 400 in accordance with one aspect is shown in FIG. 4. The computer system 400 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 400. When executed, the instructions cause the computer system 400 to perform specific actions and exhibit specific behavior, such as described herein.

The computer system 400 may include an address/data bus 402 that is configured to communicate information. Additionally, one or more data processing units, such as a processor 404, are coupled with the address/data bus 402. The processor 404 is configured to process information and instructions. In one aspect, the processor 404 is a microprocessor. Alternatively, the processor 404 may be a different type of processor such as a parallel processor, or a field programmable gate array.

The computer system 400 is configured to utilize one or more data storage units. The computer system 400 may include a volatile memory unit 406 (e.g., random access memory ("RAM"), static RAM, dynamic RAM, etc.) coupled with the address/data bus 402, wherein a volatile memory unit 406 is configured to store information and instructions for the processor 404. The computer system 400 further may include a non-volatile memory unit 408 (e.g., read-only memory ("ROM"), programmable ROM ("PROM"), erasable programmable ROM ("EPROM"), electrically erasable programmable ROM "EEPROM"), flash memory, etc.) coupled with the address/data bus 402, wherein the non-volatile memory unit 408 is configured to store static information and instructions for the processor 404. Alternatively, the computer system 400 may execute instructions retrieved from an online data storage unit such as in "Cloud" computing. In an embodiment, the computer system 400 also may include one or more interfaces, such as an interface 410, coupled with the address/data bus 402. The one or more interfaces are configured to enable the computer system 400 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 400 may include an input device 412 coupled with the address/data bus 402, wherein the input device 412 is configured to communicate information and command selections to the processor 400. In accordance with one aspect, the input device 412 is an alphanumeric input device, such as a keyboard, that may include alphanumeric and/or function keys. Alternatively, the input device 412 may be an input device other than an alphanumeric input device. In one aspect, the computer system 400 may include a cursor control device 414 coupled with the address/data bus 402, wherein the cursor control device 414 is configured to communicate user input information and/or command selections to the processor 400. In one aspect, the cursor control device 414 is implemented using a device such as a mouse, a track-ball, a track-pad, an optical tracking device, or a touch screen. The foregoing notwithstanding, in one aspect, the cursor control device 414 is directed and/or activated via input from the input device 412, such as in response to the use of special keys and key sequence commands associated with the input device 412. In an alternative aspect, the cursor control device 414 is configured to be directed or guided by voice commands.

In one aspect, the computer system 400 further may include one or more optional computer usable data storage devices, such as a storage device 416, coupled with the address/data bus 402. The storage device 416 is configured to store information and/or computer executable instructions. In one aspect, the storage device 416 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 418 is coupled with the address/data bus 402, wherein the display device 418 is configured to display video and/or graphics. In one aspect, the display device 418 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 400 presented herein is an example computing environment in accordance with one aspect. However, the non-limiting example of the computer system 400 is not strictly limited to being a computer system. For example, one aspect provides that the computer system 400 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 5:
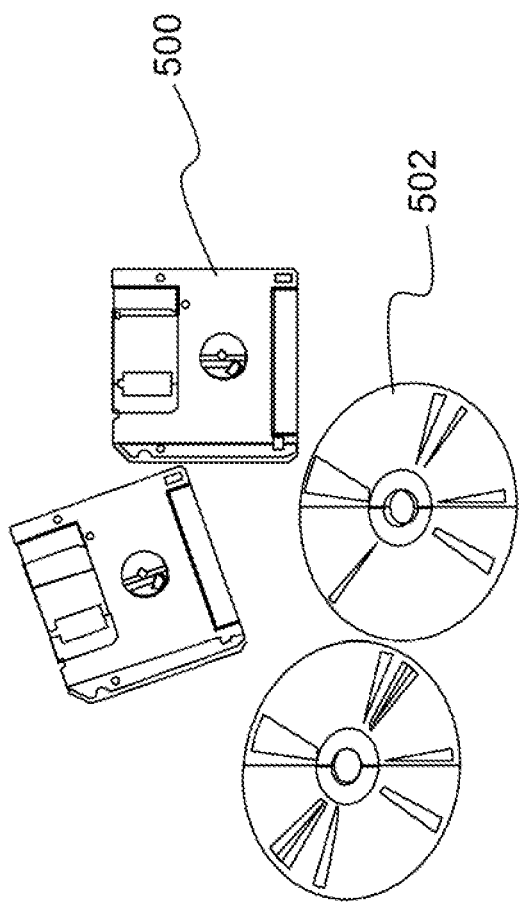
FIG. 5 is an illustration of a computer program product according to the principles of the present invention.

An illustrative diagram of a computer program product embodying an aspect of the present invention is depicted in FIG. 5. As a non-limiting example, the computer program product is depicted as either a floppy disk 500 or an optical disk 502. However, as mentioned previously, the computer program product generally represents computer readable code (i.e., instruction means or instructions) stored on any compatible non-transitory computer readable medium.

What is claimed is:

1. A system for assessing the quality of machine learning algorithms over time series, the system comprising:
one or more processors and a non-transitory memory having instructions encoded thereon such that when the instructions are executed, the one or more processors perform operations of:
selecting, in parallel, a set of random blocks of a time series data sample, wherein the time series data sample comprises a plurality of data points $X_1, \ldots, X_n$, wherein n is the number of data points in the time series data sample, and wherein the time series data sample is a sample of a much larger time series dataset;
generating, in parallel, a set of resamples by applying a bootstrapping method to each block in the set of random blocks to obtain a resample for each block, wherein the number of resamples in the set of resamples is not fixed;
determining errors on the set of resamples, wherein the errors represent variation within the set of resamples;
producing a final accuracy estimate by averaging the errors estimated on the set of resamples, wherein the final accuracy estimate is an estimate of how accurately the set of random blocks represents the time series data sample; and
using the final accuracy estimate to assess a quality of at least one machine learning algorithm over the time series dataset.

2. The system as set forth in claim 1, wherein the one or more processors further perform an operation of applying a stationary bootstrap (SB) method to each block in the set of random blocks by appending a next data point in the time series data sample to a current block in the set of random blocks with a probability 1-p, and appending a random data point from the set of random blocks with a probability p to the current block in the set of random blocks.

3. The system as set forth in claim 2, wherein the one or more processors further perform an operation of estimating an error for each block in the set of random blocks by applying a Monte Carlo approximation to repeatedly resample each block in the set of random blocks using the SB method and estimate the errors on each r resample, resulting in r resample estimates.

4. The system as set forth in claim 3, wherein a number of resamples r is determined individually by each processor.

5. The system as set forth in claim 4, wherein the one or more processors further perform an operation of forming an empirical probability distribution from the r resample estimates to approximate $\xi(\mathbb{Q}_{n,j})$, where $\xi$ denotes an estimator quality parameter, $\mathbb{Q}$ denotes the empirical probability distribution, n denotes the sample size, and j denotes the block number.

6. The system as set forth in claim 5, wherein the one or more processors further perform operations of:
averaging the errors estimated on the r resamples across all of the processors; and
producing a final accuracy estimate $s^{-1}\Sigma_{j=1}^{s}\xi^*_{n,j}$, where s denotes the number of blocks, and $\Sigma$ denotes a summation.

7. A computer-implemented method for assessing the quality of machine learning algorithms over time series, comprising:
an act of causing one or more data processors to execute instructions stored on a non-transitory memory such that upon execution, wherein the one or more data processors perform operations of:
selecting, in parallel, a set of random blocks of a time series data sample, wherein the time series data sample comprises a plurality of data points $X_1, \ldots, X_n$, wherein n is the number of data points in the time series data sample, and wherein the time series data sample is a sample of a much larger time series dataset;
generating, in parallel, a set of resamples by applying a bootstrapping method to each block in the set of random blocks to obtain a resample for each block, wherein the number of resamples in the set of resamples is not fixed;
determining errors on the set of resamples, wherein the errors represent variation within the set of resamples;

producing a final accuracy estimate by averaging the errors estimated on the set of resamples, wherein the final accuracy estimate is an estimate of how accurately the set of random blocks represents the time series data sample; and using the final accuracy estimate to assess a quality of at least one machine learning algorithm over the time series dataset.

8. The method as set forth in claim 7, wherein the one or more data processors further perform an operation of applying a stationary bootstrap (SB) method to each block in the set of random blocks by appending a next data point in the time series data sample to a current block in the set of random blocks with a probability 1-p, and appending a random data point from the set of random blocks with a probability p to the current block in the set of random blocks.

9. The method as set forth in claim 8, wherein the one or more data processors further perform an operation of estimating an error for each block in the set of random blocks by applying a Monte Carlo approximation to repeatedly resample each block in the set of random blocks using the SB method and estimate the errors on each r resample, resulting in r resample estimates.

10. The method as set forth in claim 9, wherein a number of resamples r is determined individually by each processor.

11. The method as set forth in claim 10, wherein the one or more data processors further perform an operation of forming an empirical probability distribution from the r resample estimates to approximate $\xi(\mathbb{Q}_{n,j})$, where $\xi$ denotes an estimator quality parameter, $\mathbb{Q}$ denotes the empirical probability distribution, n denotes the sample size, and j denotes the block number.

12. The method as set forth in claim 11, wherein the one or more data. processors further perform operations of:

averaging the errors estimated on the r resamples across all of the processors; and producing a final accuracy estimate $s^{-1}\Sigma_{j=1}^{s}\xi^{*}_{n,j}$, where s denotes the number of blocks, and $\Sigma$ denotes a summation.

13. A computer program product for assessing the quality of machine learning algorithms over time series, the computer program product comprising computer-readable instructions stored on a non-transitory computer-readable medium that are executable by a computer having a processor for causing the processor to perform operations of:

selecting, in parallel, a set of random blocks of a time series data sample, wherein the time series data sample comprises a plurality of data points $X_1, \ldots, X_n$, wherein n is the number of data points in the time series data sample, and wherein the time series data sample is a sample of a much larger time series dataset;

generating, in parallel, a set of resamples by applying a bootstrapping method to each block in the set of random blocks to obtain a resample for each block, wherein the number of resamples in the set of resamples is not fixed;

determining errors on the set of resamples, wherein the errors represent variation within the set of resamples;

producing a final accuracy estimate by averaging the errors estimated on the set of resamples, wherein the final accuracy estimate is an estimate of how accurately the set of random blocks represents the time series data sample; and using the final accuracy estimate to assess a quality of at least one machine learning algorithm over the time series dataset.

14. The computer program product as set forth in claim 13, further comprising instructions for causing the processor to perform an operation of applying a stationary bootstrap (SB) method to each block in the set of random blocks by appending a next data point in the time series data sample to a current block in the set of random blocks with a probability 1-p, and appending a random data point from the set of random blocks with a probability p to the current block in the set of random blocks.

15. The computer program product as set forth in claim 14, further comprising instructions for causing the processor to perform an operation of estimating an error for each block in the set of random blocks by applying a Monte Carlo approximation to repeatedly resample each block in the set of random blocks using the SB method and estimate the errors on each r resample, resulting in r resample estimates.

16. The computer program product as set forth in claim 15, wherein a number of resamples r is determined individually by each processor.

17. The computer program product as set forth in claim 16, further comprising instructions for causing the processor to perform an operation of forming an empirical probability distribution from the r resample estimates to approximate $\xi(\mathbb{Q}_{n,j})$, where $\xi$ denotes an estimator quality parameter, $\mathbb{Q}$ denotes the empirical probability distribution, n denotes the sample size, and j denotes the block number.

18. The computer program product as set forth in claim 17, further comprising instructions for causing the processor to perform operations of:

averaging the errors estimated on the r resamples across all of the processors; and producing a final accuracy estimate $s^{-1}\Sigma_{j=1}^{s}\xi^{*}_{n,j}$, where s denotes the number of blocks, and $\Sigma$ denotes a summation.

19. The system as set forth in claim 1, wherein a plurality of processors are connected though a distributed architecture with cloud services.

20. The method as set forth in claim 7, wherein the operations are performed by a plurality of processors connected though a distributed architecture with cloud services.

* * * * *